(12) United States Patent
Nishioka et al.

(10) Patent No.: US 9,962,800 B2
(45) Date of Patent: May 8, 2018

(54) TOOL CHANGER OF MACHINE TOOL

(75) Inventors: Takayuki Nishioka, Sakurai (JP);
Yoshihiro Takiguchi, Nabari (JP)

(73) Assignee: DMG MORI SEIKI CO., LTD.,
Yamatokoriyama-Shi, Nara (JP)

( * ) Notice: Subject to any disclaimer, the term of this patent is extended or adjusted under 35 U.S.C. 154(b) by 829 days.

(21) Appl. No.: 13/288,846

(22) Filed: Nov. 3, 2011

(65) Prior Publication Data

US 2012/0116570 A1 May 10, 2012

(30) Foreign Application Priority Data

Nov. 5, 2010 (JP) ................................ 2010-248989

(51) Int. Cl.
*G05B 19/00* (2006.01)
*B23Q 3/157* (2006.01)
*G05B 19/4093* (2006.01)
*B23Q 3/155* (2006.01)

(52) U.S. Cl.
CPC ..... *B23Q 3/15706* (2013.01); *B23Q 3/15503* (2016.11); *G05B 19/40938* (2013.01); *Y02P 90/265* (2015.11)

(58) Field of Classification Search
CPC ................ G05B 13/041; G05B 19/182; G05B 19/41875; G05B 2219/31103; G05B 2219/32187; G05B 19/4065; G05B 19/40938; G05B 2219/32226; G05B 2219/32235; G05B 2219/37252; G05B 2219/50242; G05B 2219/50249; B23Q 3/15706; B23Q 3/15503; Y02P 90/265
USPC .................................................. 700/177–179
See application file for complete search history.

(56) References Cited

U.S. PATENT DOCUMENTS

| 3,753,237 | A | * | 8/1973 | Koontz et al. | ................. | 700/179 |
| 3,872,743 | A | * | 3/1975 | DeCaussin | ........... | B23Q 3/1554 74/128 |
| 4,312,105 | A | * | 1/1982 | Brown | ................. | B23Q 39/042 29/35.5 |

(Continued)

FOREIGN PATENT DOCUMENTS

| JP | 1-310834 A | 12/1989 |
| JP | 04-223835 A | 8/1992 |

(Continued)

OTHER PUBLICATIONS

JP06055361 English Translation (Year: 1994).*

*Primary Examiner* — Thomas C Lee
*Assistant Examiner* — Alan Chu
(74) *Attorney, Agent, or Firm* — IP Business Solutions, LLC

(57) ABSTRACT

To provide a tool changer of a machine tool that makes it possible to surely execute machining as designated in a machining program without any need for the editing of the machining program or the replacement of tools and without complicating the device structure. The tool changer 11 includes a tool correspondence table A showing a correspondence relation between a program-designated tool T0001 designated in a machining program O0001 and an actual use tool T0003 actually used according to the machining contents designated in the machining program, wherein the actual use tool corresponding to the program-designated tool is found by using the tool correspondence table A and the found actual use tool is decided as a subsequent process tool.

8 Claims, 6 Drawing Sheets

(56) References Cited

U.S. PATENT DOCUMENTS

| | | | | |
|---|---|---|---|---|
| 4,430,717 A | * | 2/1984 | Senda et al. | 700/179 |
| 4,550,378 A | * | 10/1985 | Nozawa | G05B 19/414 |
| | | | | 318/565 |
| 4,581,810 A | * | 4/1986 | Kawakami et al. | 483/1 |
| 4,631,465 A | * | 12/1986 | Fukuyama et al. | 318/565 |
| 5,097,587 A | * | 3/1992 | Yasuda | 483/6 |
| 5,131,136 A | * | 7/1992 | Uchida et al. | 483/5 |
| 5,134,767 A | * | 8/1992 | Yasuda | 483/7 |
| 5,144,740 A | * | 9/1992 | Yasuda | 483/4 |
| 5,289,382 A | * | 2/1994 | Goto | G05B 19/4207 |
| | | | | 700/179 |
| 5,378,218 A | * | 1/1995 | Daimaru et al. | 483/9 |
| 5,688,214 A | * | 11/1997 | Mase et al. | 483/1 |
| 5,808,432 A | * | 9/1998 | Inoue | G05B 19/4069 |
| | | | | 318/561 |
| 6,090,025 A | * | 7/2000 | Matsuoka et al. | 483/2 |
| 2002/0052272 A1 | * | 5/2002 | Izumi | 483/7 |
| 2005/0038552 A1 | * | 2/2005 | Sagawa | G05B 19/4093 |
| | | | | 700/181 |
| 2008/0033591 A1 | * | 2/2008 | Lankalapalli | G05B 19/409 |
| | | | | 700/173 |
| 2012/0036511 A1 | | 2/2012 | Kawai et al. | |

FOREIGN PATENT DOCUMENTS

| | | | | |
|---|---|---|---|---|
| JP | 06055361 | * | 1/1994 | B23H 7/20 |
| JP | 10-100033 A | | 4/1998 | |
| JP | 2000-218459 A | | 8/2000 | |
| WO | 2010/116413 A1 | | 10/2010 | |

* cited by examiner

FIG.3

FOR PALLET (WORKPIECE) 1

```
O0001;
T0001;
G01 ***;
  ∙ ;
  ∙ ;
  ∙ ;
T0002;
  ∙ ;
  ∙ ;
T0003;
  ∙ ;
```

FOR PALLET (WORKPIECE) 2

```
O0002;
T0001;
G00 ***;
  ∙ ;
  ∙ ;
  ∙ ;
T0002;
  ∙ ;
  ∙ ;
T0003;
  ∙ ;
```

FOR PALLET (WORKPIECE) 3

| TOOL CORRESPONDENCE TABLE | PROGRAM NUMBER | PROGRAM-DESIGNATED TOOL NUMBER | ACTUAL USE TOOL NUMBER |
|---|---|---|---|
| A | O0001 | T0001<br>T0002<br>T0003 | T0003<br>T0004<br>T0005 |
| B | O0002 | T0001<br>T0002<br>T0003 | T0011<br>T0012<br>T0013 |
| C | O0003 | T0001<br>T0002<br>T0003 | T0013<br>T0014<br>T0015 |

FIG.6

| TOOL CORRESPONDENCE TABLE | PROGRAM NUMBER | PROGRAM-DESIGNATED TOOL NUMBER | POT NUMBER FIRST USED | NUMBER OF TOOLS USED |
|---|---|---|---|---|
| A | O0001 | T0001 | P3 | 3 |
| B | O0002 | T0001 | P11 | 3 |
| C | O0003 | T0001 | P13 | 3 |

TOOL CHANGER OF MACHINE TOOL

BACKGROUND OF THE INVENTION

1. Field of the Invention

The present invention relates to a tool changer of a machine tool that automatically changes a preceding process tool loaded in a spindle to a subsequent process tool selected from tools held by a tool magazine.

2. Description of the Related Art

A NC machine tool, for instance, includes a tool changer that selectively takes out, from a tool magazine, a tool corresponding to the machining contents designated in a NC machining program (subsequent process tool) and automatically changes a tool loaded in a spindle (preceding process tool) to the tool that is taken out.

More specifically, as a prearrangement for starting machining, an operator, for instance, stores tools to be actually used (actual use tool numbers T001, T002, . . . Tn) in pots (pot numbers P1, P2, . . . Pn) of a tool magazine and registers a correspondence relation between the pot numbers and the actual use tool numbers in a NC controller. Incidentally, it is also registered that the tool with the actual use tool number T001 is, for example, a tool for a 5 mm diameter drilling.

Generally, the numbers T001, T002, . . . of program-designated tools designated in the machining program only represent the machining order and do not correspond to the actual machining contents. Therefore, as the aforesaid prearrangement, the operator is required to rewrite the program-designated tool numbers to the actual use tool numbers corresponding to the machining contents by editing the machining program or to replace the tools stored in the pots of the tool magazine with the actual use tools corresponding to the machining contents and the machining order which are designated in the program.

However, there are problems that the editing in the former is troublesome and involves a possibility of error, and the latter takes a lot of time and trouble and has a great burden of the replacement work.

Japanese Patent Application Laid-open No. Hei 1-310834 discloses a tool controlling device that, when a tool having the number requested in a machining program is taken out from a pot of a tool magazine, compares the number of the taken out tool and the number of the requested tool, and when they match each other, starts the machining, but when they do not match each other, immediately stops the operation and displays abnormality.

SUMMARY OF THE INVENTION

The aforesaid conventional tool controlling device, though capable of preventing the machining by a wrong tool, has problems that a means for reading the tool number, a means for confirming the tool number, and so on are necessary, resulting in a complicated structure and high cost, and productivity lowers because the operation of the machine is stopped every time the tool numbers do not match each other.

It is an object of the present invention to provide a tool changer of a machine tool that makes it possible to surely execute machining as designated in a machining program, without any need for editing of the machining program and replacement of tools and without any complication of the device structure.

The present invention is a tool changer of a machine tool that changes a preceeding process tool loaded in a spindle to a subsequent process tool selected from a plurality of held tools held in pots of a tool magazine, the tool changer including a tool correspondence table showing a correspondence relation between a program-designated tool designated in a machining program and an actual use tool actually used according to a machining content designated in the machining program, wherein the actual use tool corresponding to the program-designated tool is found by using the tool correspondence table and the found actual use tool is decided as the subsequent process tool.

According to the present invention, by using the tool correspondence table showing the correspondence relation between the program-designated tool and the actual use tool, the actual use tool corresponding to the program-designated tool is found and the found actual use tool is decided as the subsequent process tool. This makes it possible to surely execute machining designated in the program in a short time, without any need for an editing work of the program or replacement of the tools in the pots.

In a preferable embodiment of the present invention, the tool correspondence table shows to which number representing the actual use tool, the number representing the program-designated tool in the machining program corresponds.

In another preferable embodiment of the present invention, the tool correspondence table shows to which number representing the pot housing the actual use tool, the number representing the program-designated tool in the machining program corresponds.

In still another preferable embodiment of the present invention, the tool correspondence table shows to which number representing the pot housing the actual use tool to be first used, out of the plural actual use tools that are continuously used, the number representing the program-designated tool appearing first in the machining program corresponds.

The tool correspondence table may show to which actual use tool number the program-designated tool number corresponds, or may show to which number of the pot housing the actual use tool, the program-designated tool number corresponds, or may show to which number of the pot housing the actual use tool to be used first, out of the plural actual use tools that are continuously used, the program-designated tool number that first appears corresponds, as in the above-described preferable embodiments. In any of the cases, it is possible to surely is execute the machining designated in the program in a short time without any need for the editing work of the program or the replacement of the tools in the pots.

In still another preferable embodiment of the present invention, a plurality of the machining programs exist, and the tool correspondence table is configured to have the correspondence relation unique to each of the machining programs.

In the still another embodiment described above, when the plural machining programs exist, the tool correspondence table is configured to have the correspondence relation unique to each of the machining programs. This makes it possible to realize the machining designated in any of the plural machining programs without any need for the editing of the program and the replacement of the tools.

BRIEF DESCRIPTION OF THE DRAWINGS

FIG. 3 is a chart showing machining programs of a NC controller of the machine tool;

FIG. 4 is a chart showing a tool correspondence table of the NC controller of the machine tool;

FIG. 6 is a chart showing a modification example of the tool zorrespondence table.

DETAILED DESCRIPTION OF THE PREFERRED EMBODIMENTS

Figure 1:
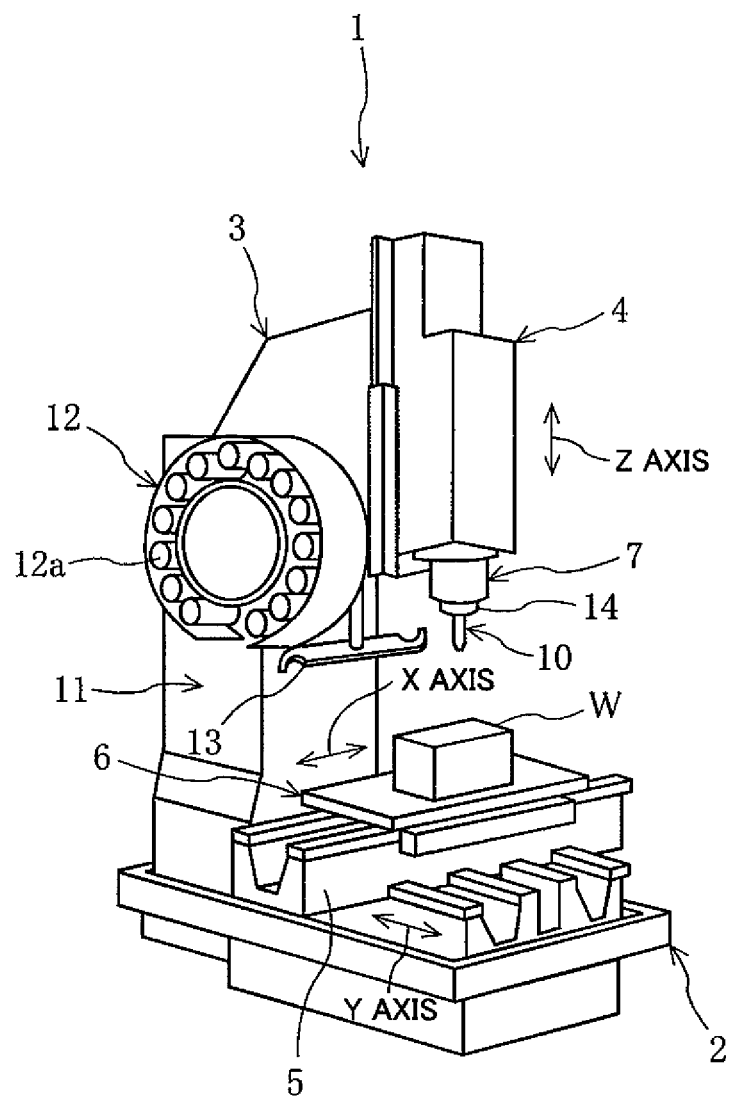
FIG. 1 is a front perspective view of a machine tool including a tool changer according to an embodiment 1 of the present invention.

An embodiment of the present invention will be hereinafter described based on the attached drawings. FIG. 1 to FIG. 5 are drawings used to describe a tool changer of a machine tool according to an embodiment 1 of the present invention.

In the drawings, 1 denotes the machine tool including a NC controller (not shown). The machine tool 1 includes: a bed 2; a column 3 provided upright on a far-side portion when seen from a front side of the bed 2; a spindle head 4 supported on a front surface of the column 3 to be movable in an up and down direction (Z-axis direction); a saddle 5 supported on a near-side portion of the bed 2 to be movable in a back and forth direction (Y-axis direction); and a table 6 supported on the saddle 5 to be movable in a right and left direction (X-axis direction).

In the spindle head 4, a spindle 7 is inserted and is rotatably supported. A tool 10 is attachably/detachably loaded in a lower end portion of the spindle 7 via a tool holder 14.

The machine tool 1 includes an automatic tool changer 11 that automatically changes a preceeding process tool that is loaded in the spindle 7 and has performed the machining to a subsequent process tool corresponding to the machining contents of a subsequent process, according to a machining program input to the NC controller.

The automatic tool changer 11 is disposed on a sidewall of the column 3, and has: a tool magazine 12 holding many tools; and a tool change arm 13 disposed between the tool magazine 12 and the spindle 7 to simultaneously change the preceeding process tool in the spindle 7 to the subsequent process tool in the tool magazine 12.

Figure 2:
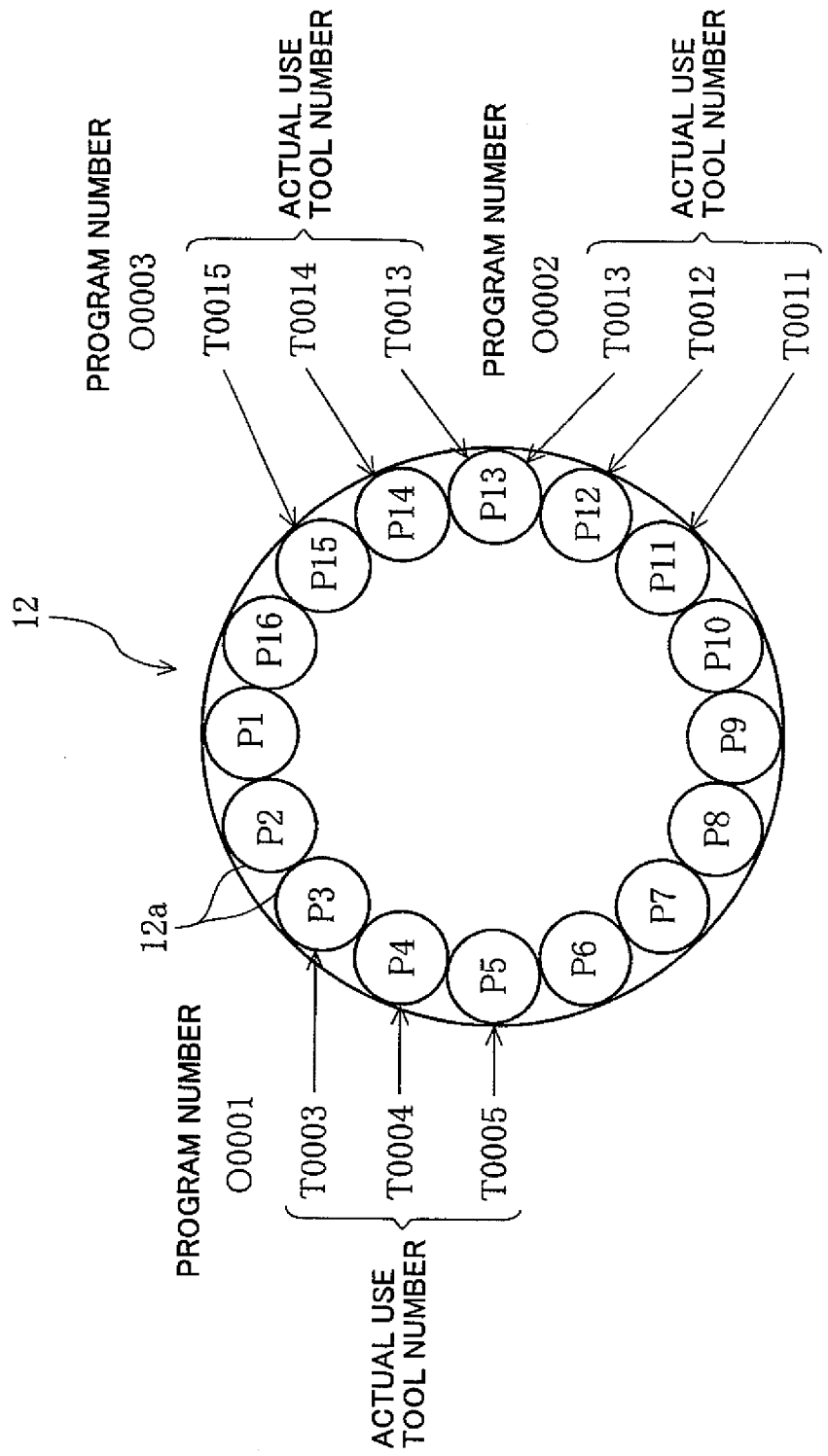
FIG. 2 is a schematic view showing the numbers of pots of a tool magazine of the tool changer and the numbers of actual use tools housed in the pots.

As shown in FIG. 2, the tool magazine 12 includes, for example, sixteen pots 12a with the pot numbers P1 to P16. Each of the pots 12a houses an actual use tool that is to be actually used, and the tools each are assigned the actual use tool number. An operator registers a correspondence relation between the pot numbers and the numbers of the actual use tools housed in the pots, in the NC controller from an operation panel. For example, the registration is made in the following manner. In the pots with the pot numbers P3 to P5, the tools with the actual use tool numbers T0003 to T0005 are housed, and similarly, in the pots with the pot numbers P11 to P15, the tools with the actual use tool numbers T0011 to T0015 are housed.

This embodiment adopts what is called a random system in which arbitrary actual use tools are housed in the pots, and therefore, the correspondence relation between the pot numbers and the numbers of the actual use tools housed in the pots is automatically updated every time the tools are changed. Incidentally, it is also possible to adopt what is called a fixed-address system in which specific tools are housed in specific pots.

The machining program is created by CAM (Computer Aided Manufacturing) based on design data by CAD (Computer Aided Design), and the NC controller includes a program unique to each pallet (workpiece) being a machining target. The NC controller includes, as shown in FIG. 3, for instance, programs with the program numbers O0001, O0002, O0003 in order to execute the machining of a palette 1, a palette 2, and a palette 3.

The program number O0001, for instance, instructs that the machining whose contents are represented by G01 . . . should be performed by using the tool with the program-designated tool number T0001, and subsequently required machining should be performed by the tools with the program-designated tool numbers T0002, T0003.

Note that normally, the program-designated tool number designated by the aforesaid program only represents the order of the use and is the number irrelevant to the actual use tool number corresponding to the actual machining contents. Therefore, as described above, it has been conventionally necessary to edit the machining program to rewrite the program-designated tool numbers to the actual use tool numbers according to the machining contents or to replace the tools stored in the pots of the tool magazine with the tools corresponding to the machining contents and the machining order designated by the program. There has been a problem that these works are complicated and involve a possibility of error and require man-hour.

Therefore, the NC controller of this embodiment includes a tool correspondence table showing a correspondence relation between the program-designated tool numbers and the actual use tool numbers as shown in FIG. 4, and finds the actual use tool number corresponding to the program-designated tool number from the tool correspondence table and decides this actual use tool number as the subsequent process tool number.

The tool correspondence table is provided for each of the program numbers. For example, a tool correspondence table A for the program number O0001 for machining the pallet number 1 shows that the program-designated tool number T0001 designated in the program number O0001 corresponds to the actual use tool number T0003, judging from the machining contents of the program number O0001. Similarly, it shows that the program-designated tool numbers T0002, T0003 correspond to the actual use tool numbers T0004, T0005 respectively.

A tool correspondence table B for the program number O0002 for machining the palette number 2, for instance, shows that the program-designated tool number T0001 designated in the program number O0002 corresponds to the actual use tool number T0011, judging from the machining contents of the program number O0002, and similarly shows that the program-designated tool numbers T0002, T0003 correspond to the actual use tool numbers T0012, T0013 respectively. This also applies to a tool correspondence table C for the program number O0003.

The correspondence relation between the actual use tool numbers and the pot numbers is registered in the NC controller as described above. Therefore, the actual use tool number corresponding to the program-designated tool number is read from each of the tool correspondence tables A, B, C, and the pot number corresponding to this actual use tool number is read based on the registered relation. Then, by indexing the pot with the aforesaid pot number at a tool change position, it is possible to execute the tool change as designated by the machining program.

Figure 5:
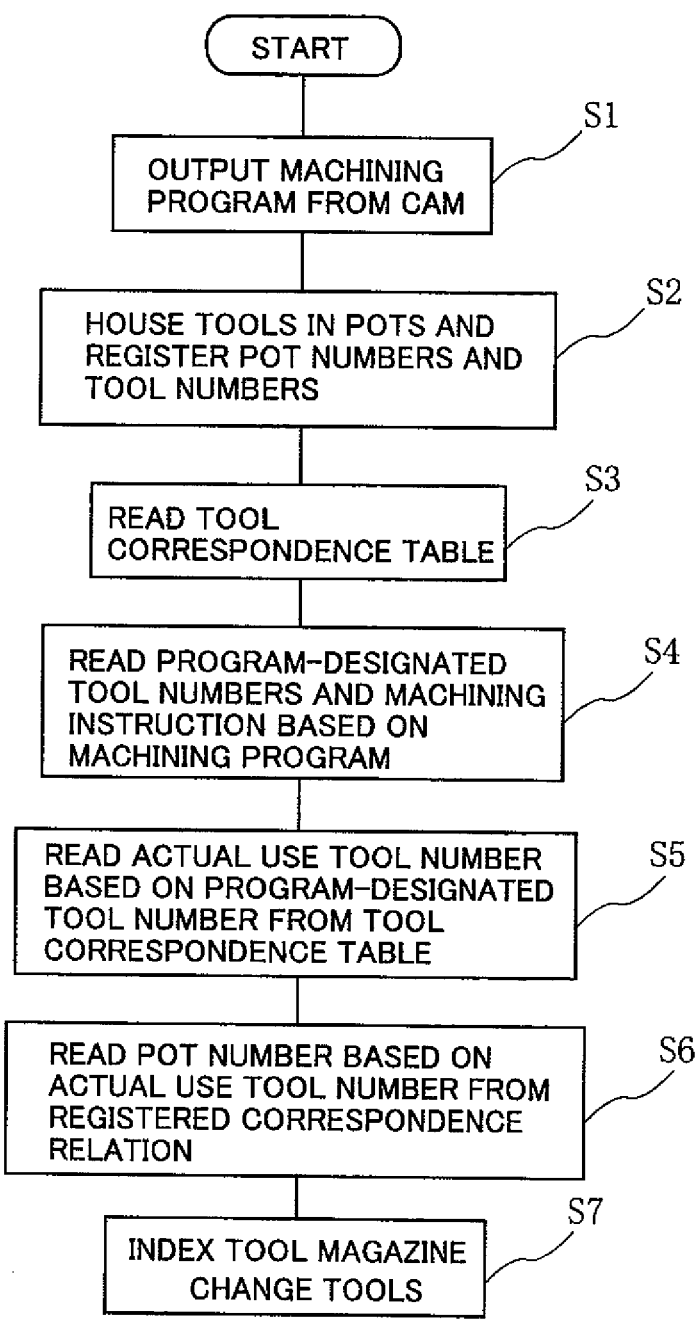
FIG. 5 is an explanatory flowchart of a tool changing operation in the machine tool.

The machining operation in this embodiment will be described in more detail according to the flowchart in FIG. 5.

First, the machining program is created by CAM based on the design data of CAD. This machining program is output to the NC controller of the machine tool 1 (Step S1). As the prearrangement for the machining, the operator houses tools thought to be necessary for the machining (actual use tools) in arbitrary ones of the pots, and registers, in the NC controller, the correspondence relation between the pot numbers and the numbers of the actual use tools housed in these pots, (Step S2).

When the machining program starts, the tool correspondence table A corresponding to the program number, for example, corresponding to O0001 is read (Step S3). Then, the program-designated tool numbers and an instruction for the machining that is to be performed by these tools (machining contents) are read (Step S4). For example, based on the tool correspondence table A, the actual use tool number T0003 corresponding to the program-designated tool number T0001 is read, and this tool is decided as a subsequent process tool (Step S5).

Subsequently, based on the registered correspondence relation between the actual use tool number (subsequent process tool) and the pot number, the pot number P3 of the pot housing the actual use tool with the number T0003 is read (Step S6). Then, the indexing of the tool magazine 12 is performed so that the pot with the pot number P3 is located at the tool change position, and the preceeding process tool 10 that is loaded in the spindle 7 and has executed the machining is changed to the indexed subsequent process tool T0003 (Step S7).

Note that as a result of the tool change, the preceding process tool 10 is housed in the pot P3 where the subsequent process tool T0003 was housed, and therefore, the correspondence relation between the pot number and the tool number is updated so as to show a new relation.

As described above, in this embodiment, since the tool correspondence tables A to C each showing the correspondence relation between the program-designated tool numbers and the actual use tool numbers are provided, it is possible to quickly find the actual use tool number based on the tool number designated in the machining program. It is possible to surely execute the machining in a short time as designated in the machining program, without any need for the editing of the program, the replacement of the tools in the pots, and so on.

Further, the tool correspondence tables A to C are provided for the respective program numbers O0001 to O0003, and therefore, even when a plurality of workpieces are to be machined according to a plurality of programs, it is also possible to surely execute the machining as designated in the machining programs in a short time, without any need for the editing of the programs, the replacement of the tools in the pots, and so on.

In the above embodiment, a description is given of the case where the tool correspondence table shows the correspondence relation between the program-designated tool numbers and the actual use tool numbers, but it should be noted that the tool correspondence table according to the present invention is not limited to this. For example, when what is called a fixed-address system in which specific tools are housed in specific pots is adopted, the tool correspondence table may show the correspondence relation between the program-designated tool numbers and the pot numbers.

Further, in the case of the fixed-address system, the tool correspondence table may show to which number representing the pot housing the actual use tool to be first used, out of the plural actual use tools that are continuously used, the number representing the program-designated tool appearing first in the machining program corresponds, as shown in FIG. 6.

Concretely, the tool correspondence table A corresponding to the program number O0001 for machining the palette 1, for instance, shows that the program-designated tool number T0001 corresponds to the pot number P3 of the pot housing the actual use tool that is used first, and the number of the tools used at this time is 3. This also applies to the tool correspondence tables B, C.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A tool changer of a machine tool that changes a preceding process tool loaded in a spindle to a subsequent process tool selected from a plurality of held tools held in pots of a tool magazine, the tool changer comprising:
    a tool correspondence table showing a correspondence relation between first and second program-designated tools which have first and second program numbers respectively, and first and second actual use tools which have first and second tool numbers respectively, the program-designate tools being designated in a machining program including a first process being an initial process of machining and a second process being subsequent to the first process of the machining, the first and second program numbers being recognized in the machining program,
    wherein the first program number corresponds to the first tool number in the correspondence table, and the second program number corresponds to the second tool number in the correspondence table,
    wherein the first actual tool is used in the first process, and the second actual tool is used in the second process,
    wherein the first and second actual use tools correspond to the first and second program-designated tools are found by using the tool correspondence table,
    wherein the first and second program numbers indicate an order of the first and second processes,
    wherein the first and second actual use tools are selected from the plurality of tools held in the pots of the tool magazine based on a previously registered corresponding relation between pot numbers and the first and second tool numbers,
    wherein the tool correspondence table shows correspondence relationships including at least the correspondence relation between one of the pot numbers and the first tool number which is used for the first process being the initial process for the machining,
    wherein changing the first actual tool and second actual tool involves housing the first actual tool in the pot number where the second actual tool was housed,
    automatically updating the correspondence relation between the pot number and the actual tool number in the tool correspondence table to show the new relation when the tool is changed.

2. The tool changer of the machine tool according to claim 1, wherein the tool correspondence table shows that the first program number corresponds to the first tool number, and that the second program number corresponds to the second tool number.

3. The tool changer of the machine tool according to claim 2, wherein
a plurality of the machining programs exist, and
the tool correspondence table is arranged to have a correspondence relation unique to each of the machining programs.

4. The tool changer of the machine tool according to claim 1, wherein
the tool correspondence table shows which one of the pot numbers corresponds to the first program number, and which one of the pot numbers corresponds to the second program number.

5. The tool changer of the machine tool according to claim 4, wherein
a plurality of the machining programs exist, and
the tool correspondence table is arranged to have a correspondence relation unique to each of the machining programs.

6. The tool changer of the machine tool according to claim 1, wherein
a plurality of the machining programs exist, and
the tool correspondence table is arranged to have a correspondence relation unique to each of the machining programs.

7. The tool changer of the machine tool according to claim 1, wherein
a plurality of the machining programs exist, and
the tool correspondence table is arranged to have a correspondence relation unique to each of the machining programs.

8. The tool changer of the machine tool according to claim 1, wherein
the first program number is one.

* * * * *